United States Patent
Benson et al.

(10) Patent No.: US 8,590,921 B2
(45) Date of Patent: Nov. 26, 2013

(54) BAND CART STORAGE SYSTEM AND METHOD

(75) Inventors: Jeffrey Wayne Benson, Bradenton, FL (US); Roy Donald Legrange, Jr., Bradenton, FL (US)

(73) Assignee: Dulond Tool & Engineering, Inc., Sarasota, FL (US)

( * ) Notice: Subject to any disclaimer, the term of this patent is extended or adjusted under 35 U.S.C. 154(b) by 2131 days.

(21) Appl. No.: 11/383,002

(22) Filed: May 12, 2006

(65) Prior Publication Data
US 2007/0262567 A1 Nov. 15, 2007

(51) Int. Cl.
B62B 3/02 (2006.01)
(52) U.S. Cl.
USPC ........ 280/656; 280/79.7; 280/47.35; 182/123
(58) Field of Classification Search
USPC ............... 280/33.998, 47.18, 79.7, 79.3, 651; 182/123, 124, 127
See application file for complete search history.

(56) References Cited

U.S. PATENT DOCUMENTS

| | | | | |
|---|---|---|---|---|
| 2,798,652 A * | 7/1957 | Easton | ............................. | 182/17 |
| 3,463,265 A * | 8/1969 | Clover | ............................ | 182/17 |
| 3,817,346 A * | 6/1974 | Wehmeyer | ....................... | 182/14 |
| 3,937,329 A * | 2/1976 | Hammerel | ................. | 211/41.14 |
| 3,977,689 A * | 8/1976 | Rosa | ......................... | 280/33.996 |
| 3,997,024 A * | 12/1976 | Fredricks et al. | ............... | 182/17 |
| 4,222,579 A * | 9/1980 | Frydendal | ................. | 280/33.996 |
| 4,238,097 A | 12/1980 | Clausen et al. | | |
| 4,275,665 A * | 6/1981 | Silverman | ....................... | 108/14 |
| 4,302,023 A * | 11/1981 | Kiesz | .......................... | 280/43.24 |
| 4,350,357 A * | 9/1982 | Zenner et al. | ................. | 280/79.3 |
| 4,427,093 A * | 1/1984 | Wehmeyer et al. | ........... | 182/141 |
| 4,505,495 A * | 3/1985 | Foss et al. | ...................... | 280/651 |
| 4,620,608 A * | 11/1986 | Gilbreath | ........................ | 182/17 |
| 4,913,614 A | 4/1990 | O'Rarden | | |
| 4,951,780 A | 8/1990 | Kim | | |
| 5,040,809 A * | 8/1991 | Yang | ............................... | 280/42 |
| 5,111,907 A * | 5/1992 | Kishi | ........................... | 182/69.4 |
| 5,129,611 A * | 7/1992 | Grover et al. | ................. | 248/688 |
| 5,228,716 A | 7/1993 | Dahl | | |
| 5,464,236 A | 11/1995 | Benting et al. | | |
| 5,476,282 A | 12/1995 | Dahl | | |
| 5,481,988 A * | 1/1996 | Dess | ............................. | 108/106 |
| 5,588,500 A * | 12/1996 | Yonahara | ....................... | 182/141 |
| 5,819,872 A * | 10/1998 | Krause | ............................. | 182/17 |
| 5,871,219 A * | 2/1999 | Elliott | .......................... | 280/79.3 |
| 5,875,652 A | 3/1999 | Davis | | |
| 5,876,050 A | 3/1999 | Berger | | |
| 5,924,577 A * | 7/1999 | Gessert | ........................ | 211/41.1 |
| 6,485,037 B1 | 11/2002 | Sulcer, Jr. | | |

(Continued)

OTHER PUBLICATIONS

Director's Showcase, "Director's Showcase Home", www.dshowcase.com; Director's Showcase distributes a line of podiums and carts for marching band equipment.

(Continued)

Primary Examiner — Jeffrey J Restifo
(74) Attorney, Agent, or Firm — Jacox, Meckstroth & Jenkins

(57) ABSTRACT

A band cart storage system and method having a storage cart that defines a storage area for receiving at least one or a plurality of portable and collapsible band carts and also that is capable of providing a platform that is adjustable for supporting instruments, components or even a person, such as a director or drum major, above the ground.

33 Claims, 15 Drawing Sheets

(56) References Cited

U.S. PATENT DOCUMENTS

| | | | |
|---|---|---|---|
| 6,637,549 B1 * | 10/2003 | Lopacki | 182/127 |
| 6,749,215 B2 * | 6/2004 | Perelli et al. | 280/651 |
| 6,979,005 B1 * | 12/2005 | McLerran | 280/33.998 |
| 7,017,940 B2 * | 3/2006 | Hatfull | 280/652 |
| 7,448,632 B1 * | 11/2008 | Nieto | 280/47.24 |
| D588,279 S * | 3/2009 | Stevens | D25/62 |
| 7,513,333 B2 * | 4/2009 | Davis | 182/63.1 |
| 2002/0105169 A1 | 8/2002 | Dahl | |
| 2008/0073880 A1 * | 3/2008 | Bess | 280/651 |

OTHER PUBLICATIONS

Jarvis, Inc., Jarvis Online, Marching Band Equipment, www.jarvisonline.com; Jarvis, Inc. manufactures a folding mobile percussion platform.

School-Tech, Inc., Wolverine Sports Coaching Stands and Towers, www.wolverinesports.com/band6.html; Wolverine Sports sells towers for coaching and marching band directors.

* cited by examiner

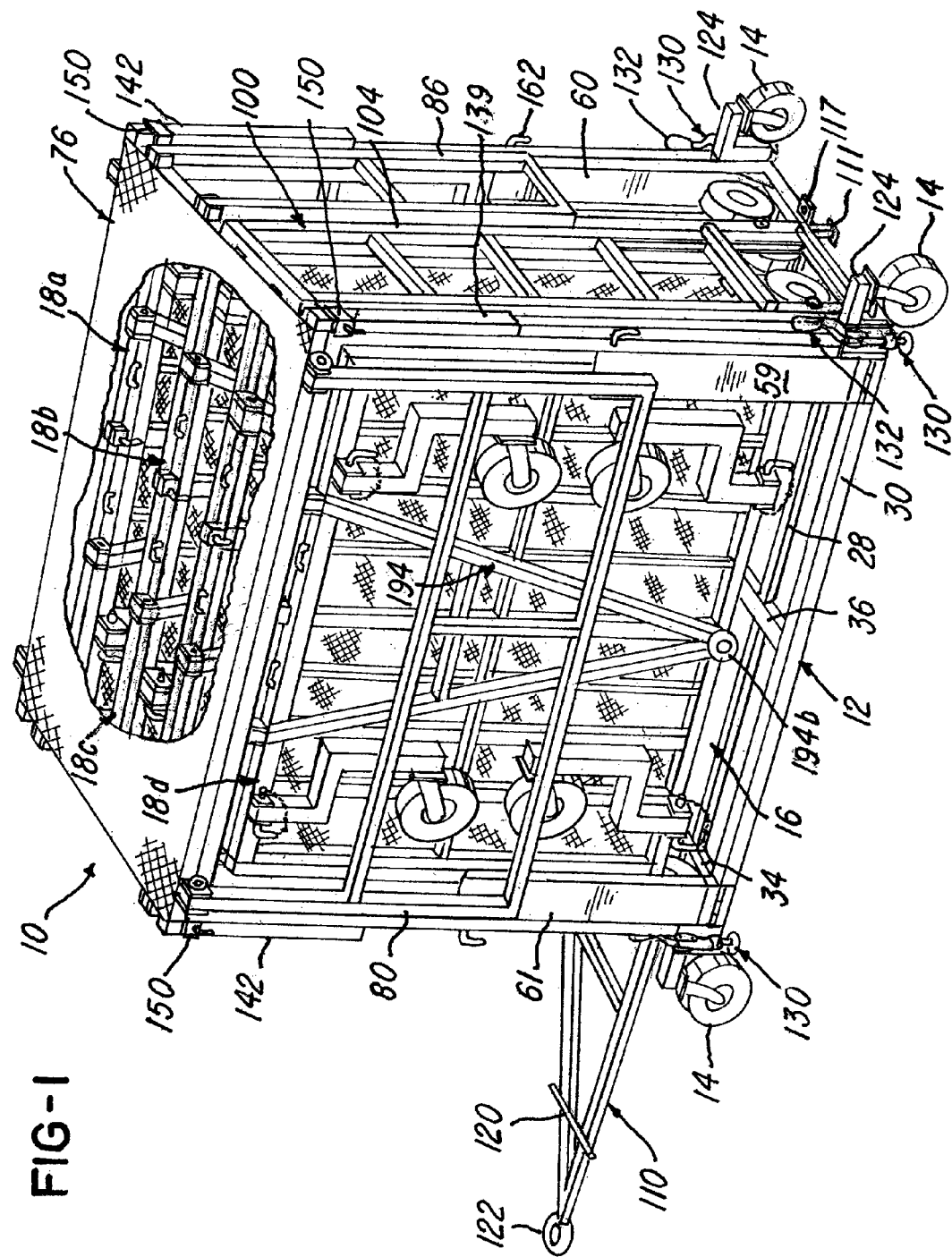

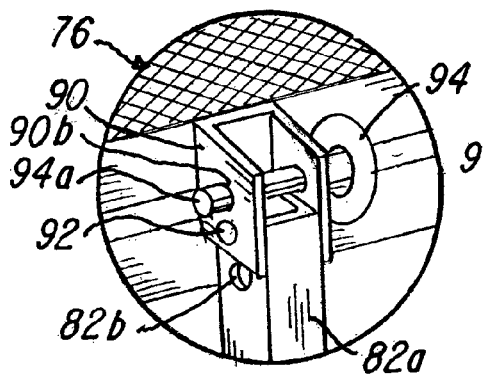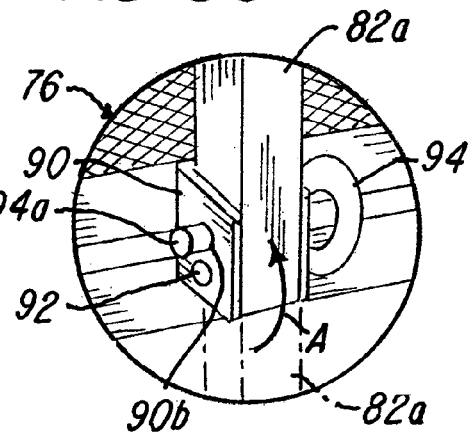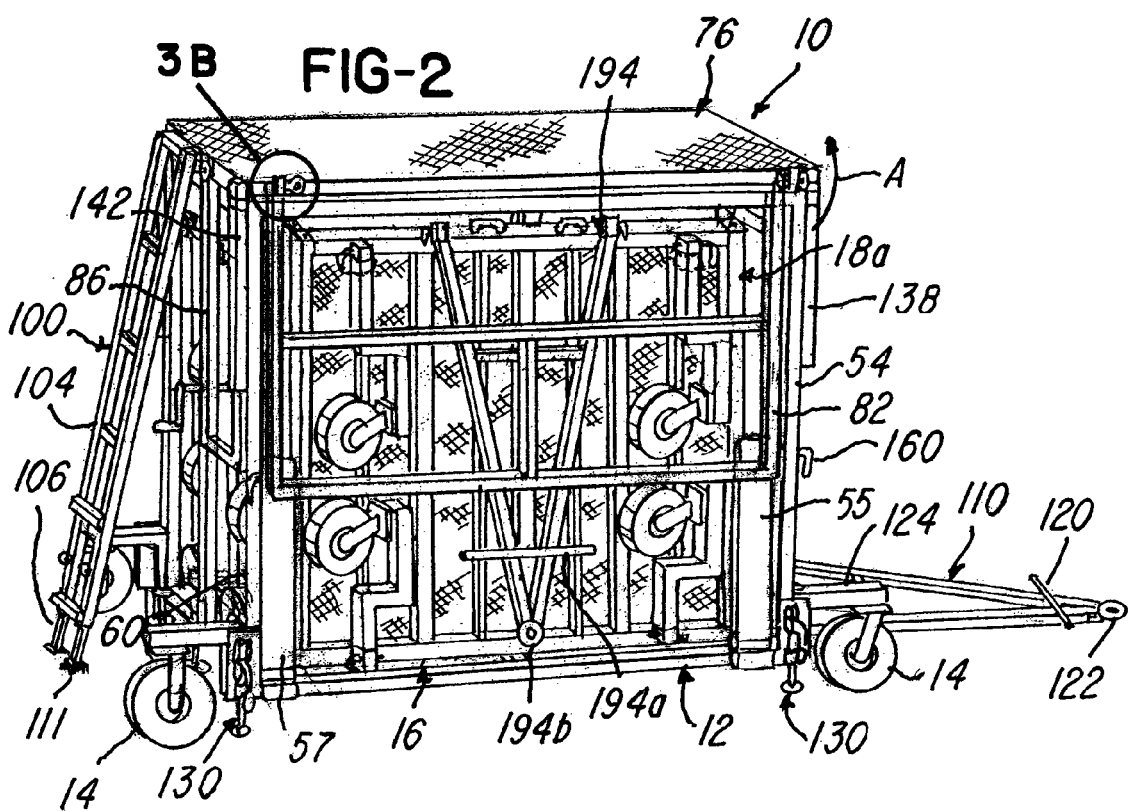

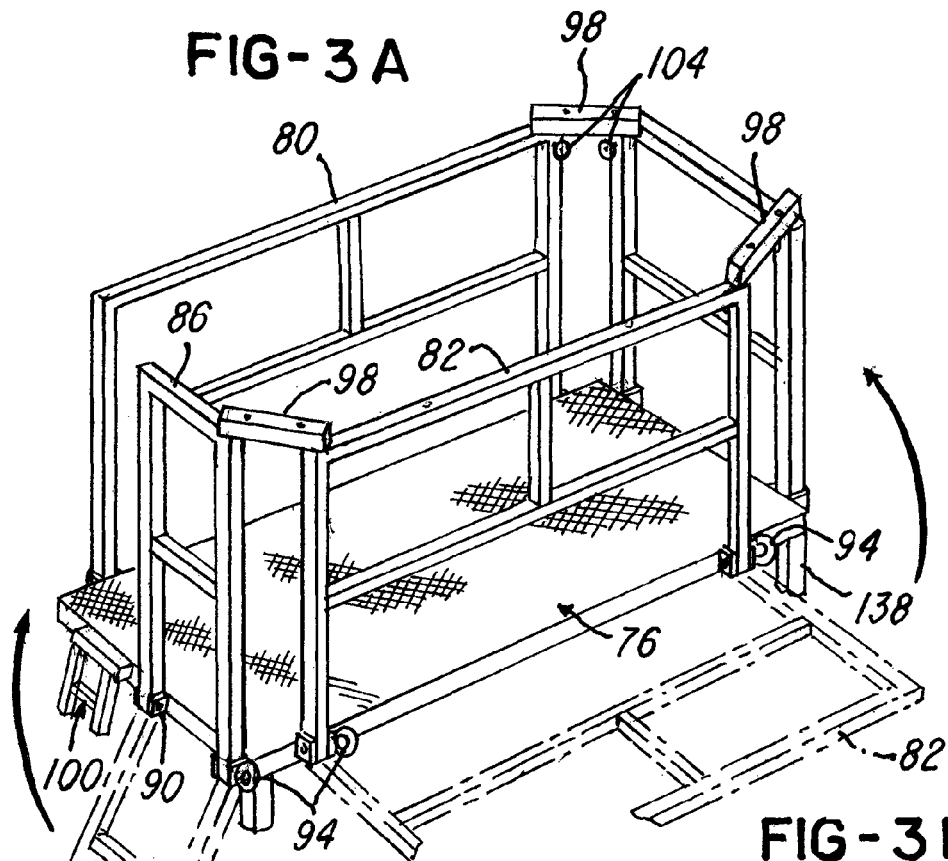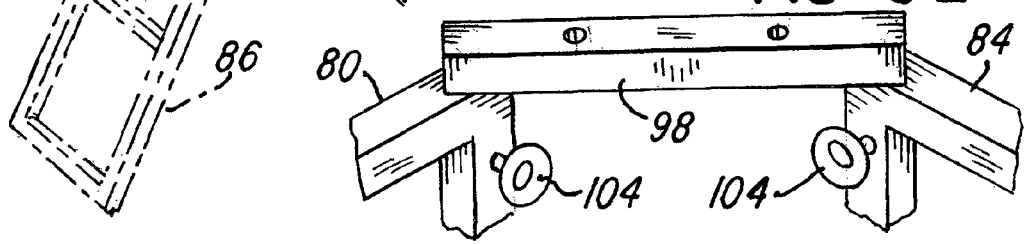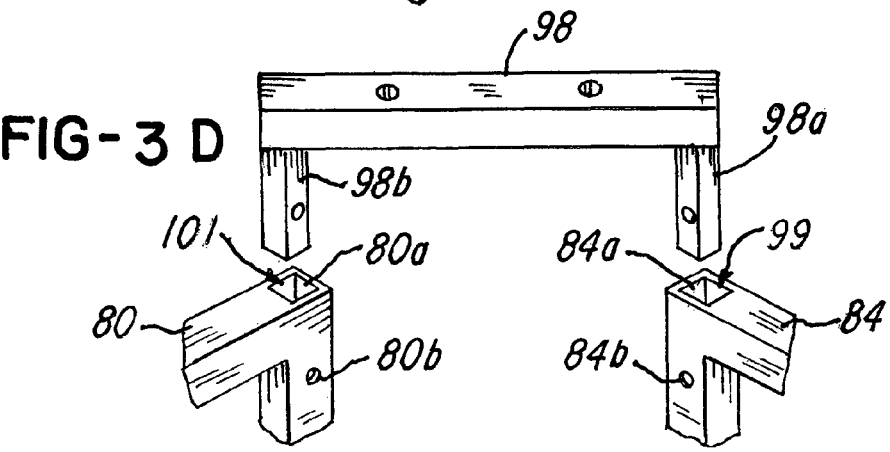

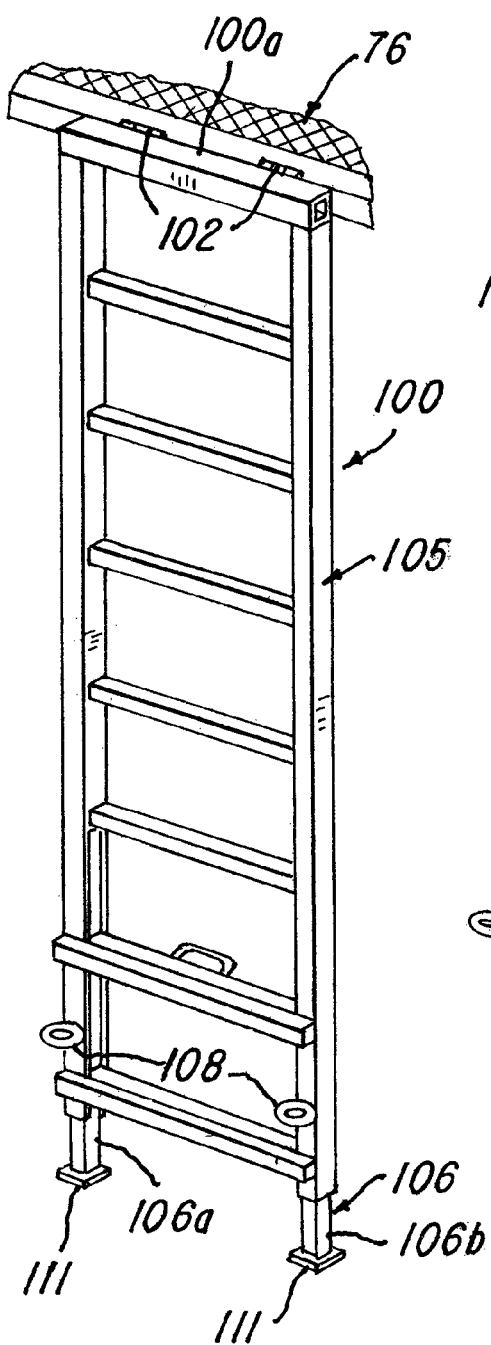
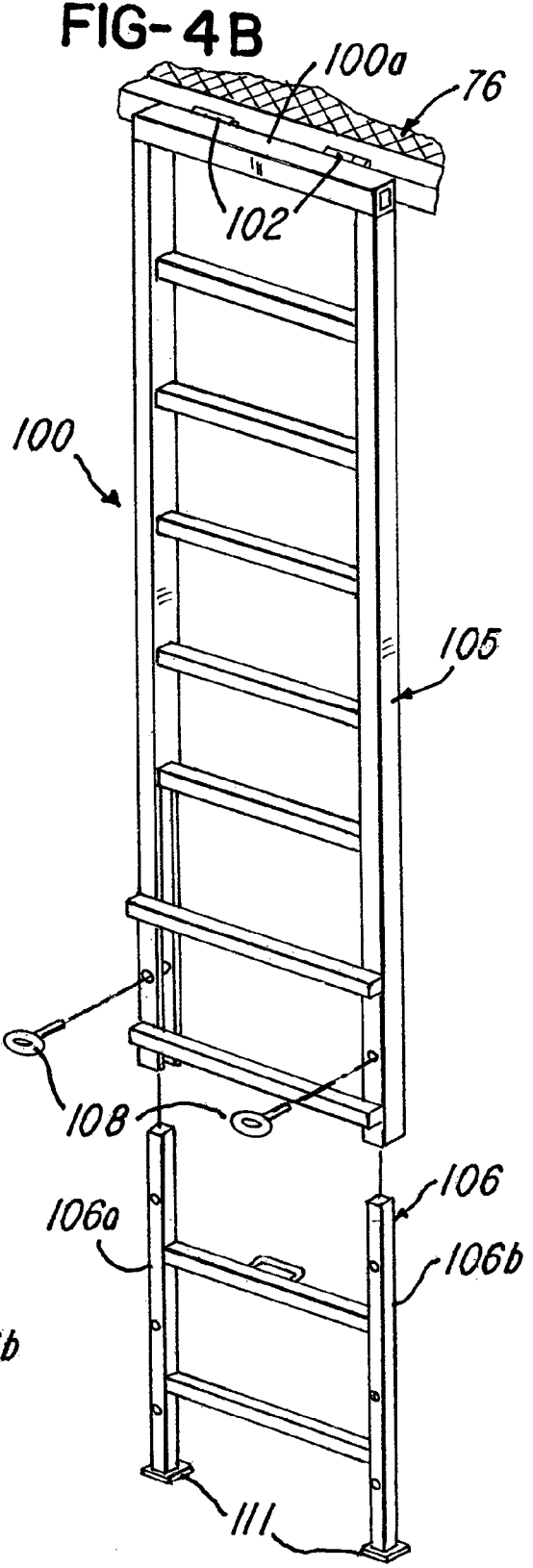

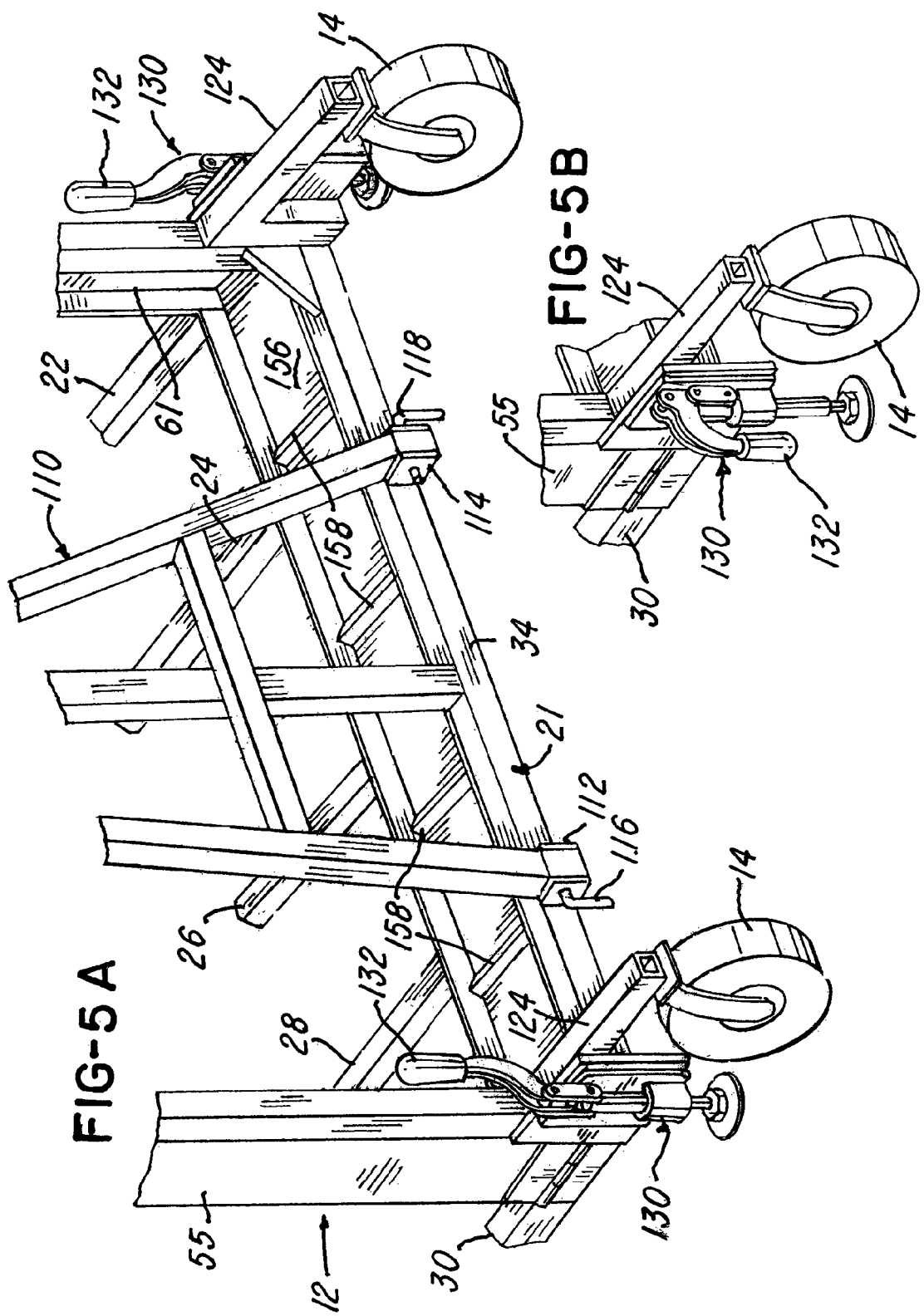

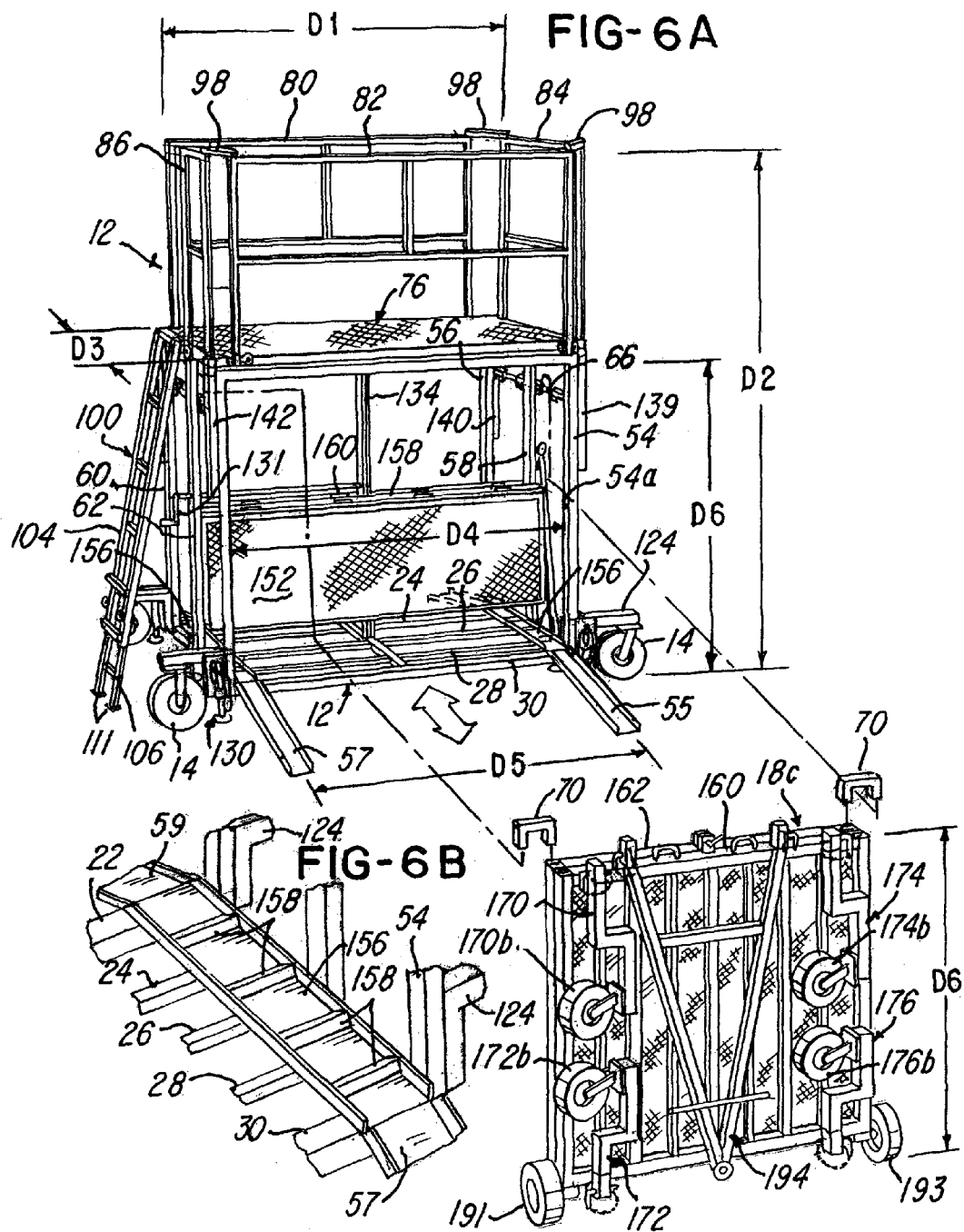

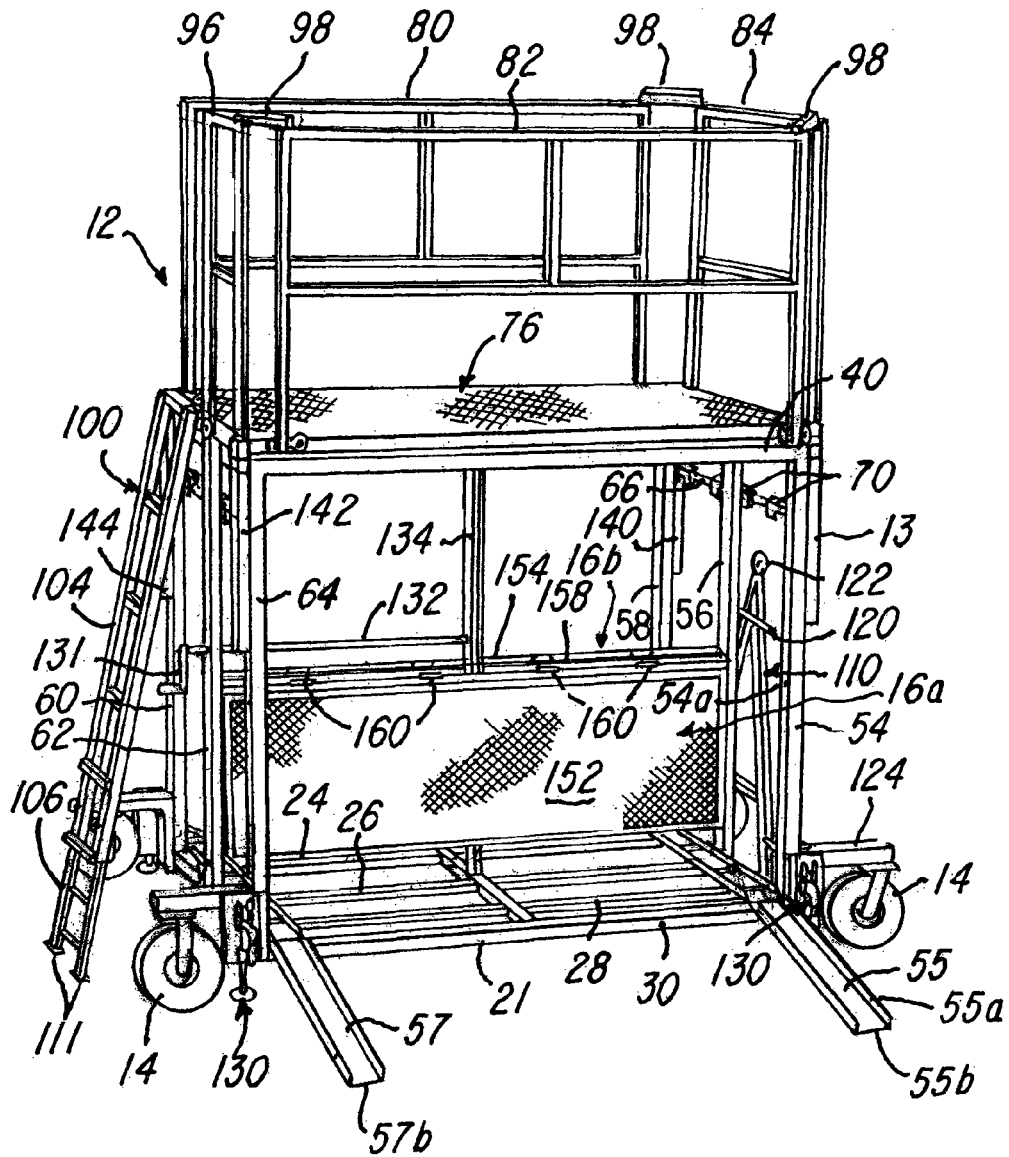

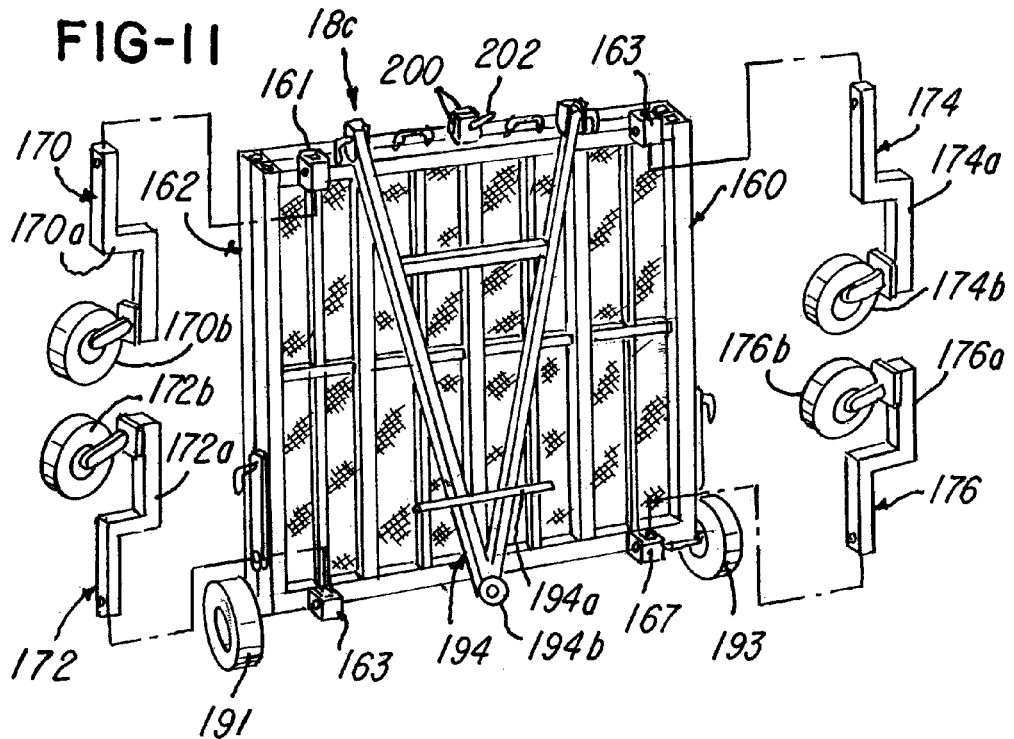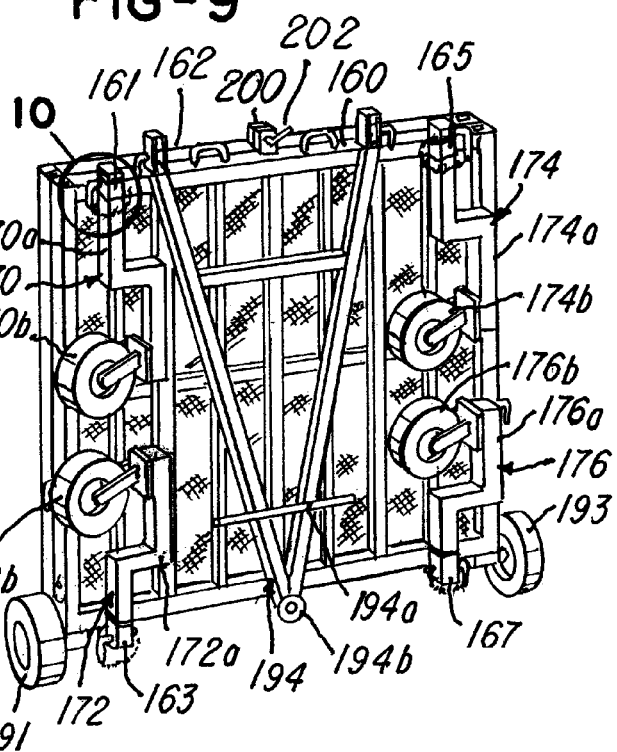

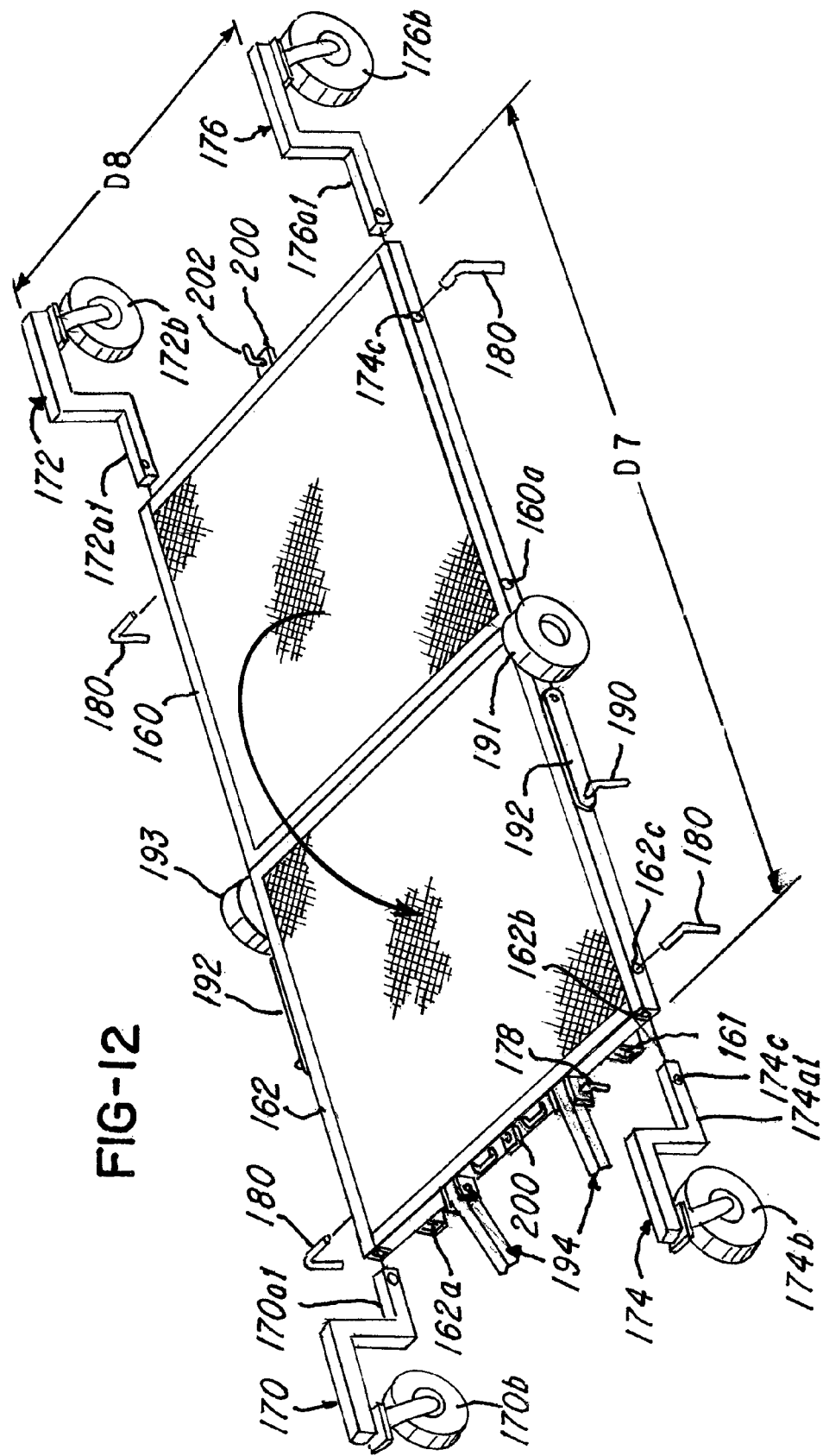

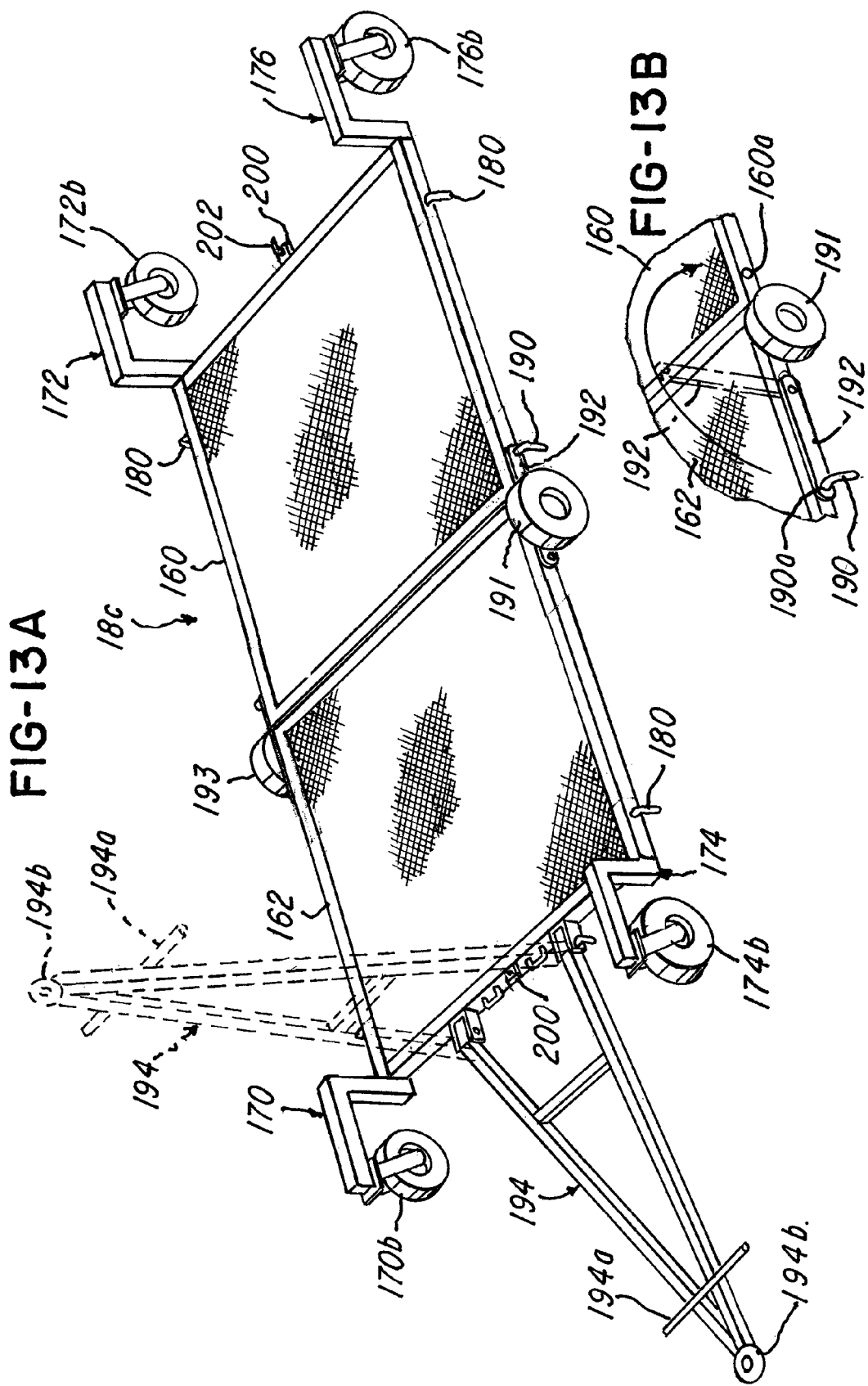

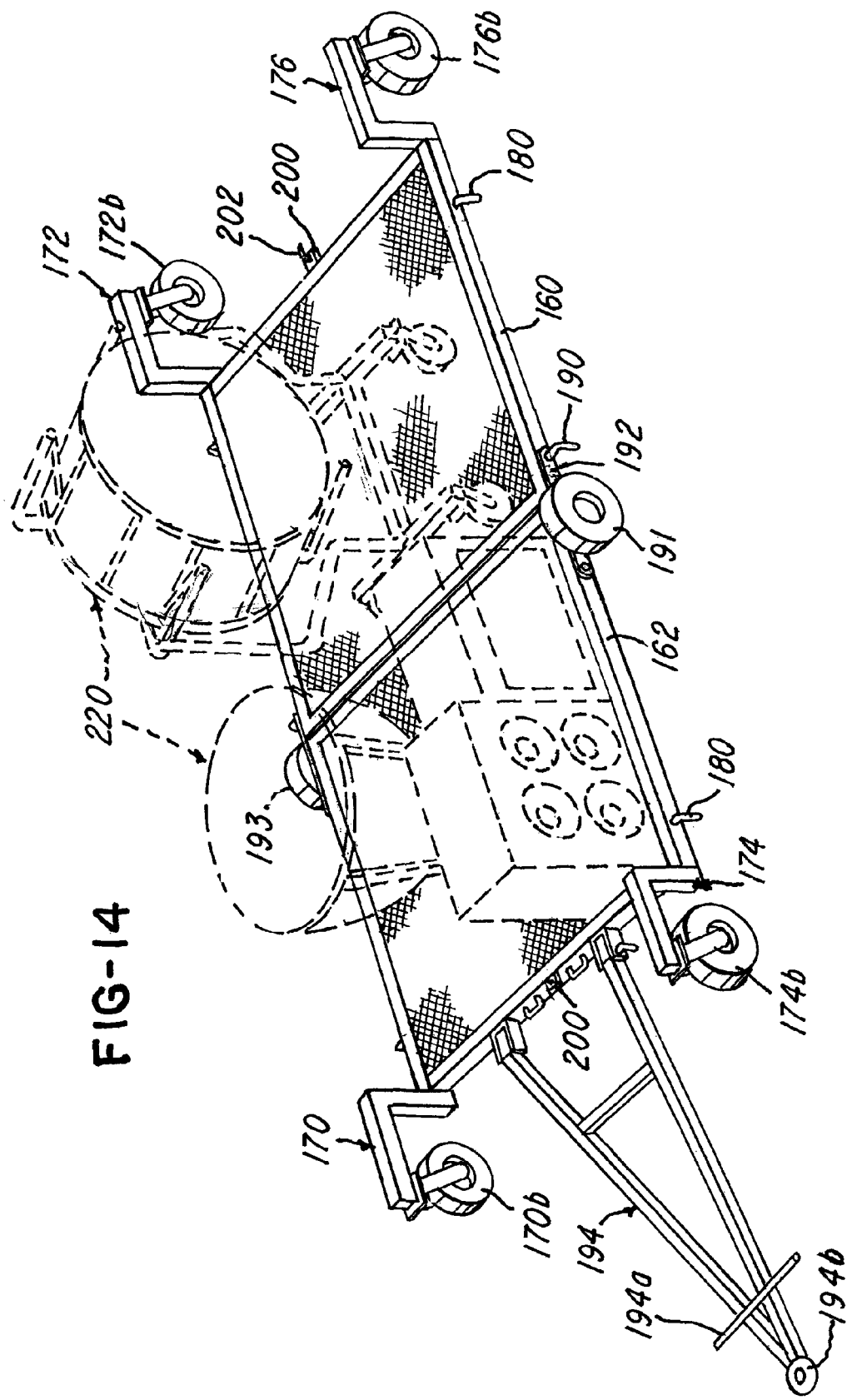

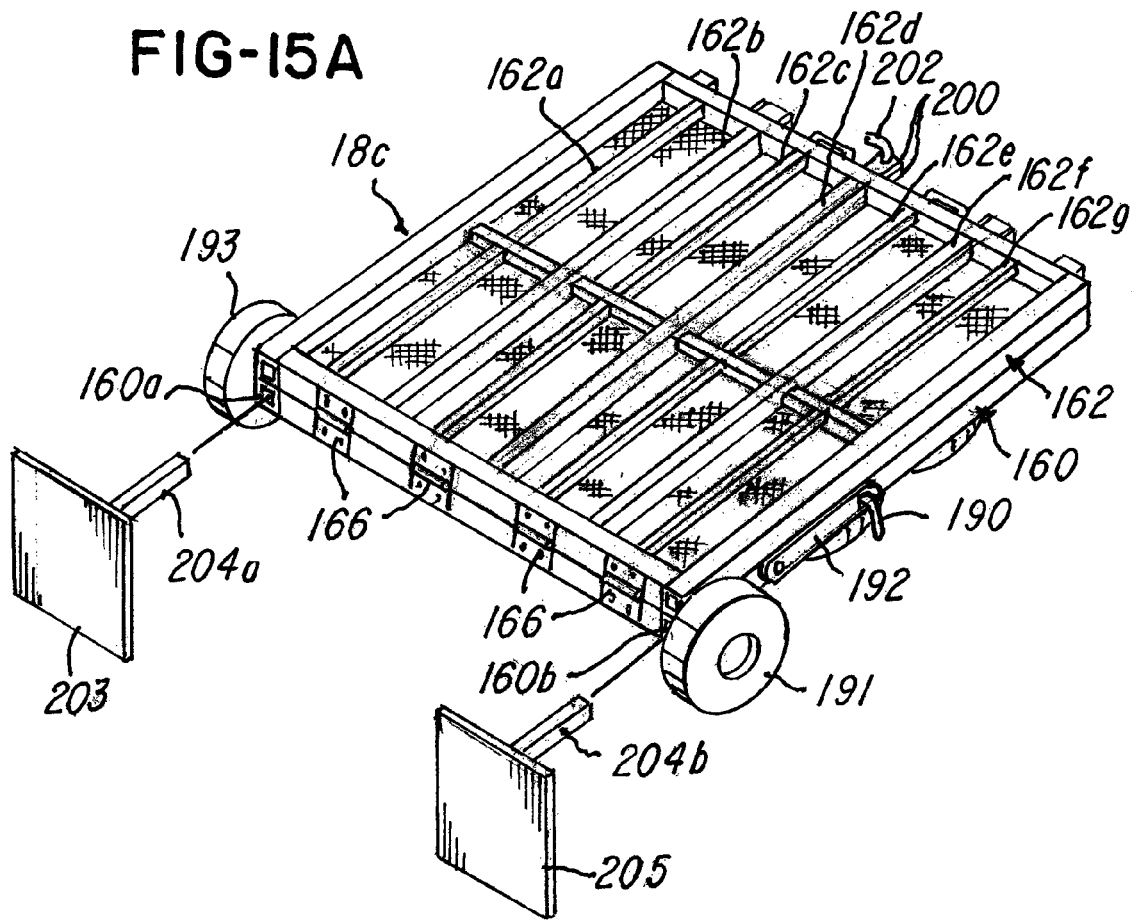
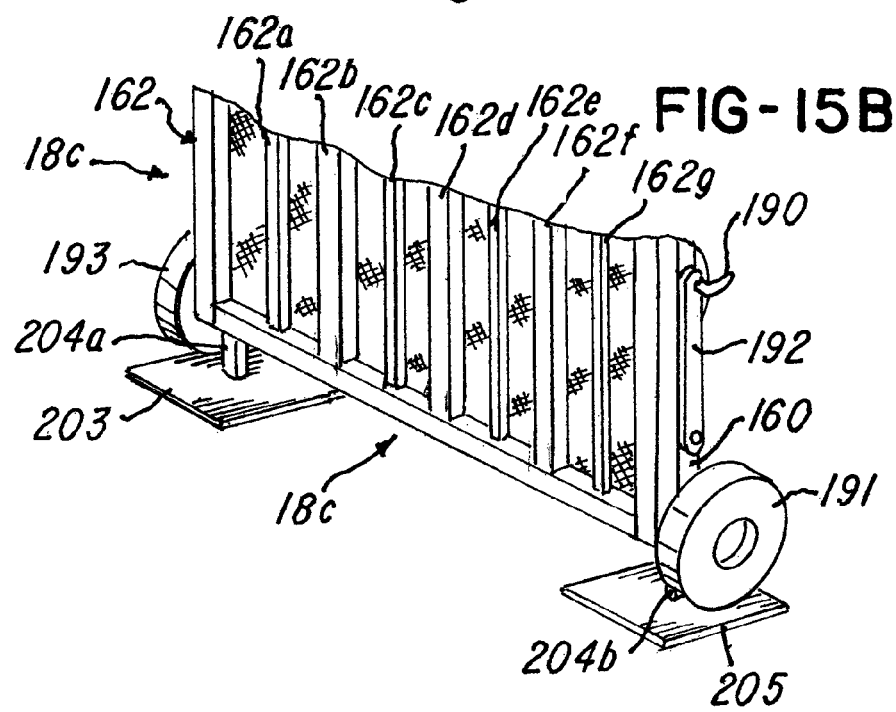

BAND CART STORAGE SYSTEM AND METHOD

I. BACKGROUND OF THE INVENTION

1. Field of the Invention

This invention relates to a band cart/drum major storage system and method and, more particularly, to a band cart storage system having a storage cart with adjustable platform and/or a storage cart capable of storing one or more band carts.

2. Description of the Related Art

Many improvements have been made over the years in the use of hand trucks and dollies for material handling and for moving equipment and instruments, such as band instruments, PA systems, amplifiers, speakers and the like. The problems of transporting such instruments, especially during a band competition, have become increasingly difficult. For example, during a typical high school band competition, a high school band will compete against other bands from other high schools. During such competition, it is necessary for the band to enter and exit a competition area, such as a field or an indoor area in an allotted time, such as 9 minutes. During this time, they are obliged to remove their equipment and instruments from the competition area.

Moreover, during a competition, a typical approach is to use a hand dolly, push cart or to attach a trailer, for example, a tractor or golf cart. Such trailers have the disadvantage of being very large and being hard to transport from competition to competition, as well as not being very compact. For example, US Patent Application Publication 2002/0105169 discloses a convertible cart for transporting objects.

It is often the requirement of musicians, such as a musical or rock and roll band, that they must set up extremely quickly and must break down the equipment quickly. As such, it is a requirement for a musical instrument transport cart that the cart be able to be assembled into its proper position for receiving equipment very quickly and easily. Thus, a band cart must be capable of rapid assembly and positioning such that it can carry objects such as amplifiers, band equipment, drums and the like toward, into and away from a competition area.

During competitions or practices, it is sometimes necessary that the director or, perhaps, a drum major or other person be elevated above the ground on a platform so that the band members, for example, can see and be directed by the director or drum major during the competition. It is oftentimes a necessity or desirable to have a director or drum major situated at various distances above the ground during such performance or practice. While director platforms and podiums have been used in the past, such platforms and podiums are typically a fixed distance from the ground and could not be elevated during competition or retracted for storage and transportation. Also, such platforms typically consume a large amount of space and are not capable of providing storage for band carts.

What is needed, therefore, is a system and method for overcoming one or more of the problems of the prior art and that provides certain improvements that are desirable to consumers, such as band directors or drum majors.

II. SUMMARY OF THE INVENTION

It is, therefore, an object of the invention to provide an improved system and compact method for transporting instruments.

Another object of the invention is to provide a director's stand having an adjustable flat platform.

Another object of the invention is to provide a portable band cart that is foldable and storable in a storage area defined by a director's stand.

Still another object is to provide a combination director's stand and band cart storage system that are movable, compact and easy to transport either separately or together.

Still another object of the invention is to provide a storage cart for storing at least one or a plurality of other carts, such as a cart used to support band equipment.

Still another object of the invention is to provide a band cart that, when in a stored position, does not consume a large amount of space and is easy to store, yet is capable of transporting a plurality of band items, such as drums, amplifiers, PA systems, musical instruments and the like.

In one aspect, one embodiment comprises a band cart storage system comprising a storage cart having a plurality of wheels, the storage cart defining a storage area, and at least one band cart removably stored in said storage area.

In another aspect, one embodiment comprises a director stand comprising a frame, a platform mounted on the frame and a plurality of wheels mounted on the frame to facilitate moving the storage cart, the platform being adjustable to permit a position of the platform to be changed.

In still another aspect, one embodiment comprises a portable band cart comprising a frame, a plurality of wheels, the frame comprising a plurality of frames that, when folded become generally parallel to facilitate storing the portable band cart.

In yet another aspect, one embodiment comprises a band equipment system comprising a first support, a second support and at least one of the first supports or the second support providing a support platform for a person and the other of the first support or the second support providing a band equipment support.

In still another embodiment, a band cart storage system comprising a storage cart comprising a base having a plurality of wheels, a plurality of side walls and a platform that cooperates with the plurality of side walls and the base to define a storage area; and a plurality of band carts removably situated on the base and in the storage area.

Other objects and advantages of the invention will be apparent from the following description, the accompanying drawings and the appended claims.

III. BRIEF DESCRIPTION OF THE DRAWING

FIG. 1 is of a view of a storage cart having a storage area capable of storing at least one or a plurality of other carts such as band carts;

FIG. 2 is a view illustrating various features of the storage and band carts shown in FIG. 1;

FIGS. 3A-3E illustrate various features of the pivotal rails or fences that may be pivoted to a raised position and various devices for locking the rails in place to surround a platform which may support a person, such as a band director, or drum major, or materials or instruments, such as a PA system;

FIGS. 4A-4B illustrate a pivotal and adjustable ladder that is pivotally attached to the storage cart;

FIGS. 5A-5B are fragmentary views illustrating various features of a hitch, hand jacks and wheels affixed to the storage cart;

FIGS. 6A-6B illustrate various features of the system showing the ramps and an exemplary insertion or removal of a portable band cart from a storage area;

FIG. 7 is a view of the storage cart with ramps deployed during, for example, a loading or unloading position and a plurality of shelves in a stored position;

FIG. 9 is a view of the band cart in a vertical position after it has been removed from the storage area;

FIG. 10 is an enlarged view of the area indicated in FIG. 9;

FIG. 11 illustrates the removability and detachability of the wheels from the band cart;

FIG. 12 is a view illustrating the attachment of the detachable wheels onto the band cart and deployment of the band cart to an operative position;

FIGS. 13A-13B are views illustrating various features of the band cart;

FIG. 14 is a view illustrating the band cart in support position and further illustrating a plurality of instruments and components (shown in phantom) supported by the cart;

FIGS. 15A-15B are various views showing a plurality of supports for supporting the band cart in a generally vertical position.

IV. DETAILED DESCRIPTION OF THE PREFERRED EMBODIMENT

Figure 8A:
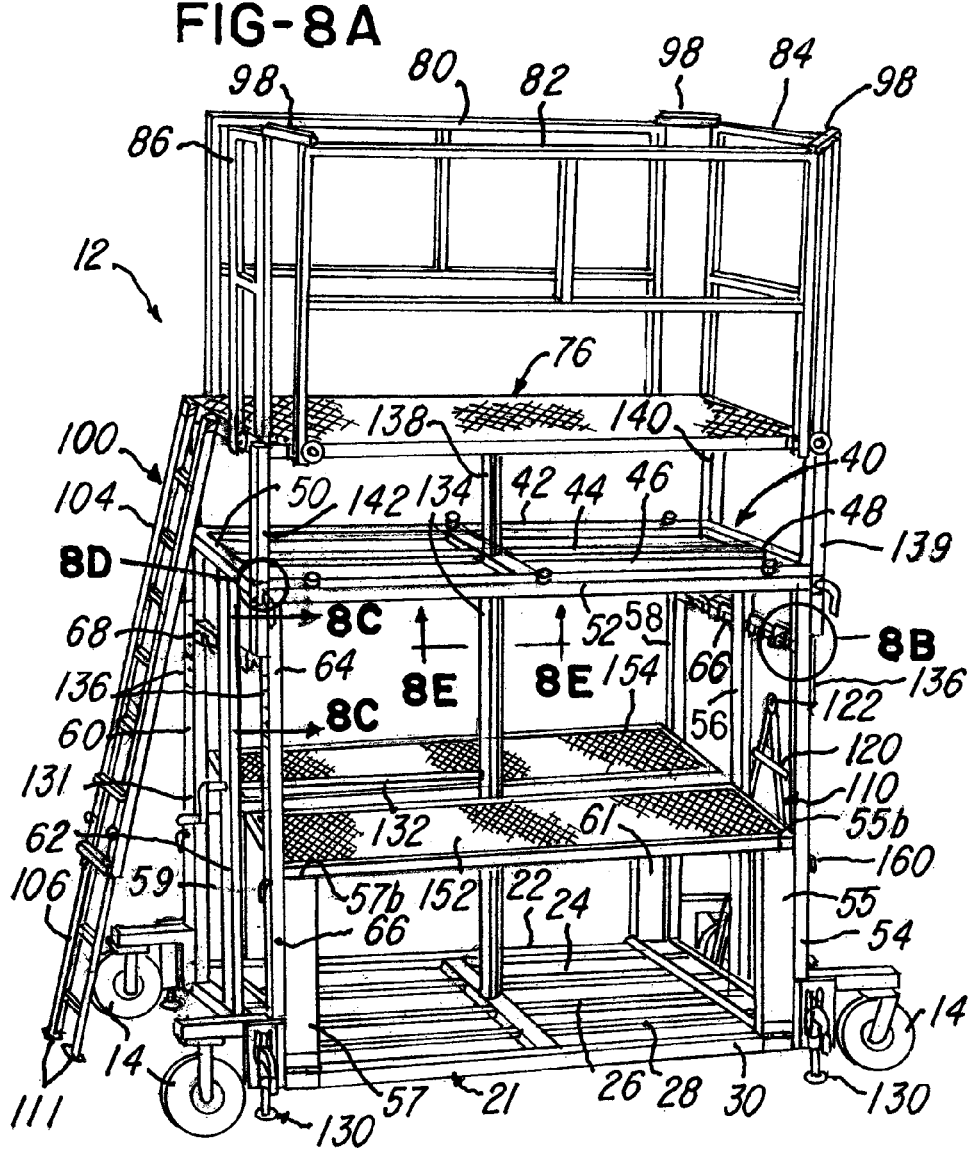
FIG. 8A is a view illustrating the platform of the storage cart being raised from a home position shown in FIG. 7 to a higher or raised position and also illustrating a plurality of shelves raised to an operating position and supported by the ramps as shown.
Figure 8C:
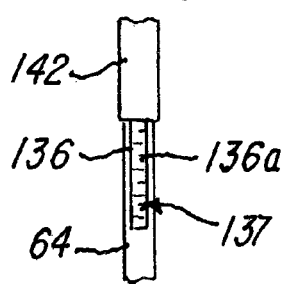
FIG. 8C illustrates an indicia which may be used to provide an indication of a distance that the platform illustrated in FIG. 8A is raised above the ground.

Referring now to FIG. 1, a band cart storage system 10 and method will now be described. The band cart storage system 10 comprises a stand or storage cart 12 having a plurality of wheels 14. The storage cart 12 defines a storage area 16 for receiving at least one or a plurality of portable instrument supports, platforms or band carts 18a, 18b, 18c and 18d that are removably received and stored in the storage area 16 as illustrated in FIGS. 1 and 2. For ease of illustration, the examples shown in FIGS. 1 and 2 illustrate four portable carts, 18a, 18b, 18c and 18d received in the storage area 16, but it should be understood that the storage cart 12 and storage area 16 could receive or be adapted to receive fewer or more carts depending upon the application and number of band carts desired to be stored in the storage area 16.

Advantageously, the system 10 and method provides a support or platform for supporting items, components or persons, such as a director or drum major, and also provides means for storing and transporting a plurality of instrument supports, platforms or band carts 18a-18d, all of which are portable and movable as described herein. For ease of illustration and description, the operation and function of the director's or drum major's stand will be described and then the operation and function of one of the band carts, such as band cart 18c, will be described, but it should be understood that each of the carts 18a-18d operate and function in substantially the same manner. It should also be understood that while the procedure of operating and using the director or drum major's stand 12 and carts 18a-18d will be described in a manner of typical use, it should be understood that the invention is not limited to this particular manner and procedure of use and such manner of use may occur in different steps.

Referring to FIGS. 1-3D, the director or band major's storage cart 12 will now be described. The cart 12 defines a storage cart comprising a first generally horizontal frame, base or support 21 comprised of a plurality of horizontal base or frame support members 22, 24, 26, 28, 30, 32 (FIG. 1), 34, 36 and 38, as illustrated in FIGS. 1 and 7. A second generally horizontal frame, base or support 40 comprises a plurality of support or frame members 42, 44, 46, 48 and 50 as best illustrated in FIG. 8A. The support members 22-36 that cooperate to define the first horizontal frame 21 and the support members 42, 44, 46, 48 and 50 (FIG. 8A) that cooperate to define the second horizontal frame 40 are welded together in a manner that is conventionally known. A plurality of vertical support members 54 (FIG. 7), 56, 58, 60, 62 and 64 are secured, such as by weld, to the two horizontal frame members 21 and 40 together as shown.

Figure 8B:
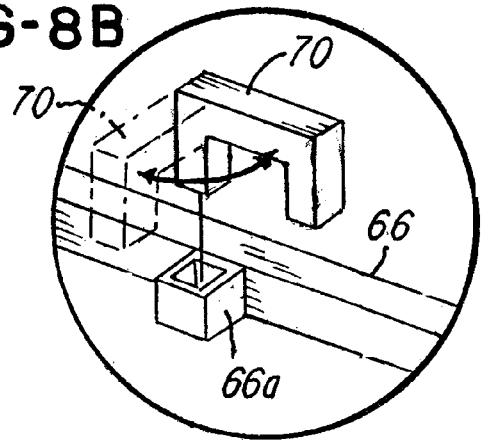
FIG. 8B is a view illustrating a lock that is used to secure the band cart in a stored and locked position and also illustrating the locks in a stored position when not in use.

As illustrated in FIG. 8B, note that a pair of frame members 66 and 68 comprise a plurality of channel members 66a for receiving a generally U-shaped lock for securing or locking the band carts 18a-18d to the frame 12. As shown in FIG. 8B, note that the lock can be removed from a holding bracket 66a, moved between a locking position, shown in FIG. 6A, to a stored position illustrated in FIG. 8B.

Referring to FIGS. 3A-3E and 6A-8, notice that the director or drum major's cart or stand 12 has an adjustable platform 76 having a plurality of pivotal fences or rails 80-86 that are pivotable (as illustrated in phantom in FIG. 3A) from a stored position (FIGS. 1, 2 and 3B) to an upright or deployed position, illustrated in FIGS. 3A, 3C and 6A-8. Notice in FIGS. 3B-3C that the platform 76 has a generally U-shaped bracket 90 secured thereto, for example, by a weld. Each bracket 90 has a pivot pin 92 that pivotally secures each leg, such as leg 82a of fence or rail 82, thereto. Each leg of each fence or rail, such as rail 82, is pivotally secured to the bracket 90 so that it can be pivoted from the stored position to the upright or deployed position. As illustrated in FIGS. 3B-3C, the platform 76 further comprises a locking pin 94 which is received in aperture 90b of bracket 90 when the fence or rail, such as fence or rail 82, is in the stored position (FIG. 2), preventing the fence or rail from pivoting in the direction of arrow A. During use, the pin 94 may be removed from the aperture 90b so that the fence or rail 82 may be pivoted in the direction of arrow A (FIG. 2) to an upright or deployed position in the illustration shown in FIG. 2, after which the pin 94 may be reinserted into both aperture 82b and 90b as shown in FIG. 3C. In this regard, notice that each leg of the fences or rails 82-86 comprises an aperture, such as the aperture 82c in FIG. 3B for receiving the locking portion 94a of the locking pin 94 as illustrated in FIG. 3C.

During deployment, each of the fences or rails 82-86 are pivotally moved from the stored position, illustrated in FIGS. 1 and 2, to the upright and locked position illustrated in FIGS. 3A and 6A-8. Each of the fences or rails 82-86 are locked or secured in the deployed position in the manner described earlier relative to FIGS. 3B and 3C. To further provide stability to the fences or rails 82-86 after they have been moved to the upright and deployed position illustrated in FIGS. 3A and 6A-8, a plurality of generally U-shaped locks or connectors 98 are used to connect adjacent fences or rails together as will now be described relative to FIGS. 3D and 3E. For example, after the fences or rails 80 and 84 have been moved to the upright and deployed position illustrated in FIG. 3A, the legs 98a (FIG. 3D) and 98b of connector 98 may be aligned with generally square apertures 99 and 101, respectively, which are defined by walls 84a and 80a. The apertures 99 and 101 complement the shape of the legs 98a and 98b as shown. After the leg portions 98a and 98b of connector 98 are received in the apertures 99 and 101, respectively, apertures 84b and 98b become generally aligned and a locking pin 104 may be inserted as shown to couple or lock the connector 98 to the fences or rails 84 and 80, as shown in FIG. 3E.

Figure 16:
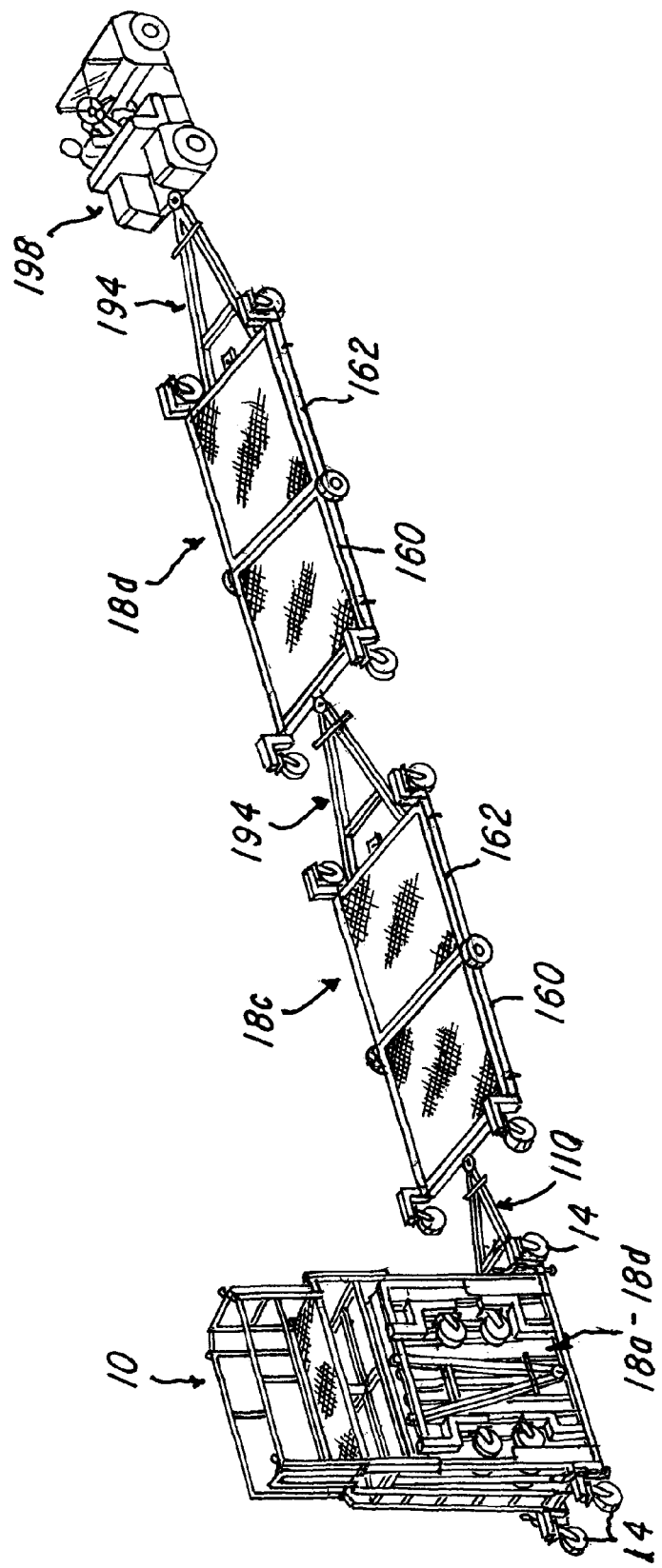
FIG. 16 is a view illustrating a plurality of band carts coupled or ganged together to the director's stand and further coupled to a vehicle for transporting the director's stand and band carts toward and away from an area of use.

Referring now to FIGS. 4A, 4B, 6 and 7, note that the director's or drum major's stand or cart 12 further comprises a ladder 100 having an end 100a that is pivotally secured to the platform 76 with hinges 102. Note that the ladder 100 comprises a first portion 105 and a second telescoping portion 106 that telescopes into and out of the first portion 105 and is secured thereto with the locking pins 108 as shown. As illustrated in FIG. 16, the ladder 100 may be situated in a stored position (shown in FIG. 16) during which the legs 106a and 106b of portion 106 are in a fully retracted position as shown in FIG. 4A. During use, the legs 106a and 106b are extended or telescoped downward, as viewed in FIGS. 6, 7 and 4B, so that the ladder 100 may be situated at a predetermined angle as illustrated in FIGS. 2, 6 and 7. The length of the ladder 100 may be adjusted so that the feet 106a and 106b engage the ground. Although not shown, the ladder 100 may have handrails to facilitate climbing the ladder up to the platform 76. In the illustration being described, the ladder is 65⅝ inches long and can be adjusted to as long as 89 inches.

During use, it is typical that the fences or rails 80-86 are first raised and secured in the position illustrated in FIGS. 6 and 7, the platform 76 is adjusted to a predetermined height as described later herein, and then the ladder 100 is adjusted to a predetermined length which will depend upon the angle at which the ladder 100 is set.

Referring now to FIGS. 5A and 5B, notice that the storage cart 12 further comprises a hitch 110 that is pivotally secured to the cart via brackets 112 and 114 with removable pins 116 and 118, respectively, as illustrated in FIG. 5A. As shown in FIG. 2, the hitch 110 comprises a handle 120 for pulling or pushing the cart 12 manually and a circular hitch 122 or means for securing the cart 12 to another cart 12, other carts 18a-18b or a transporting device such as a golf cart or vehicle as illustrated in FIG. 15. For example, the carts 12 and 18a-18b may have a hitch 117 (FIG. 1).

As mentioned earlier herein, the cart 12 has a plurality of wheels 14, each of which are secured to a generally L-shaped bracket 124 that is secured to the frame 20 by suitable means such as fasteners, bolts or a weld. Note that the wheels may be swivel wheels for permitting the cart 12 to be moved or swiveled 360 degrees.

Note also that the cart 12 has a plurality of support jacks 130 (FIGS. 5A-5B) having a manual actuation handle 132 that may be pivoted from a non-support position, illustrated in FIGS. 1 and 5A, to a support position, illustrated in FIGS. 5B and 7, during which the jacks 130 facilitate supporting or stabilizing the storage cart 12. The support jacks 130 provide not only stability for the storage cart 12, but they also facilitate leveling the storage cart 12, particularly for the convenience and safety of any person or persons situated on the platform 76.

As best illustrated in FIGS. 6-8, the storage cart 12 further comprises means, a lifter or an adjuster for adjusting a position of the platform 76 and for raising and lowering the platform 76 between a stored position, illustrated in FIGS. 6 and 7, to a desired position, illustrated in FIG. 8 as shown. In the embodiment being illustrated, the lifter, adjuster or means for raising the platform 76 comprises a hand crank 131 that is coupled to a crank shaft 132 that is in turn coupled to a center jack 134, which in the embodiment being described is a 1500 lb capacity Happijac Camper Jack. It should be noted that the platform 76 comprises a frame 77 (FIG. 8E) on which a support surface, such as an expanded metal, metallic plate or wire mesh material, is secured by, for example, weld. The center jack 134 comprises a piston 138 having an end 138a is secured a center rib or frame member 77a by a T-bracket 139 as shown. The platform 76 is raised or lowered by cranking the hand crank 131 which, in turn, activates the center jack 134. In one embodiment, the center jack 134 is a 1500 pound jack, available from Happijac Corporation, Kaysville, Utah. Although not shown, it should be understood that other means, lifter or adjuster device may be used, such as an electric motor, foot jack or other suitable means for adjusting a position of the platform between the stored position, illustrated in FIG. 6 and the raised position, illustrated in FIG. 8A. After the platform 76 is positioned at the defined position, one or more locking pins 169 (FIG. 8D) may be received in the bracket 150 and guides 142 to lock the platform 76 in position.

Figure 8D:
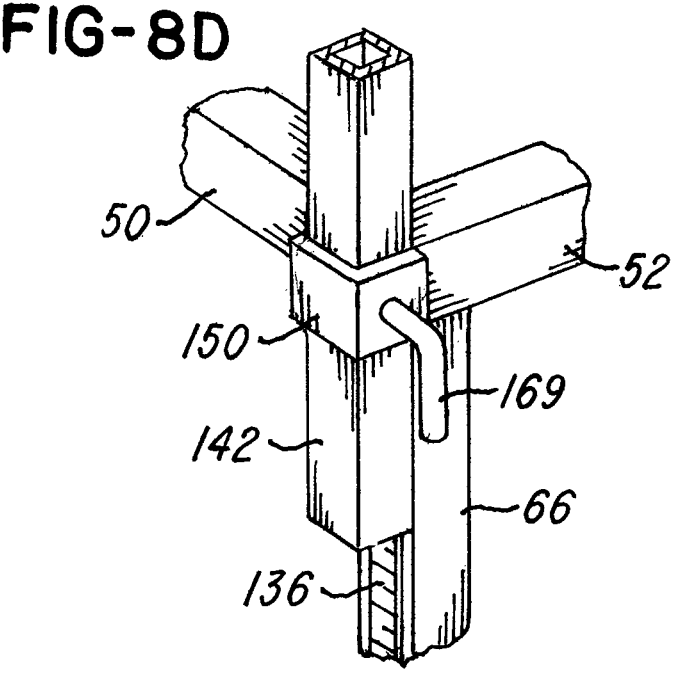
FIG. 8D is a fragmentary view of a lock for securing the platform in a locked position.
Figure 8E:
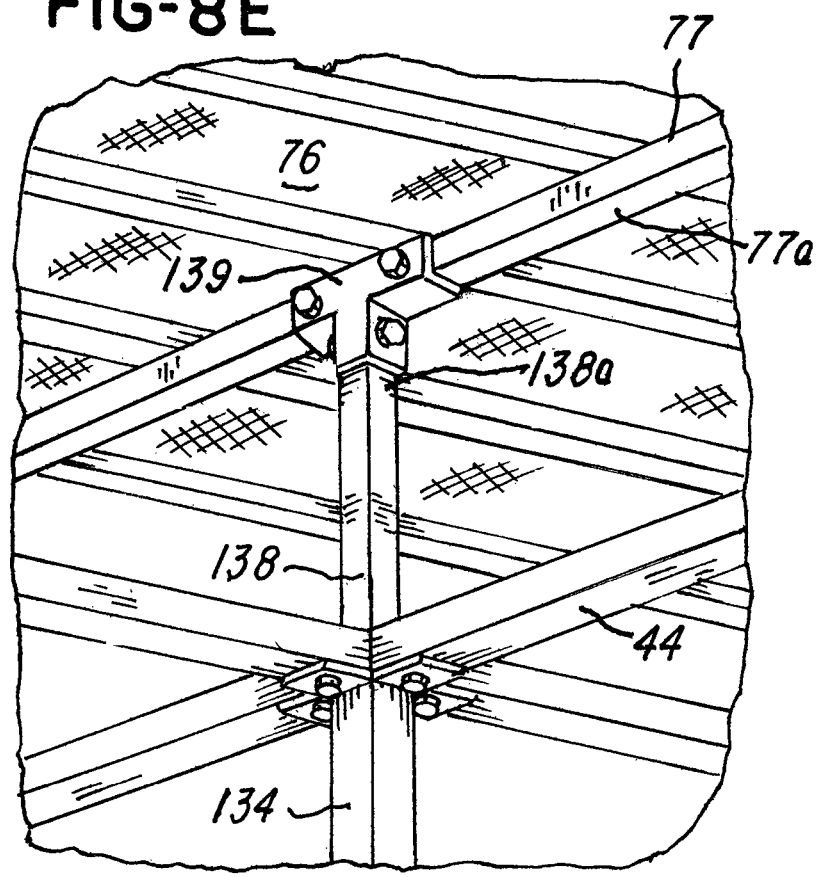
FIG. 8E is a view showing a bottom of the platform and an armature of telescoping jack.

Notice that the platform 76 may comprise a plurality of guides 139-144 (FIGS. 7 and 8D) for facilitating guiding and stabilizing the platform 76 between the support and raised position shown. For example, as illustrated in FIG. 8B, the frame 40 may comprise a plurality of brackets 150 welded thereto for receiving the guides, such as guide 142 in the illustration shown in FIG. 8B. A Teflon® wear strip and guide 136 (FIG. 8C) may be secured to each vertical column 54, 58, 60 and 64 in association with said bracket 150, as illustrated in FIG. 8D, to facilitate movement of the platform 76. It should be understood that the strip 136 may have indicia for indicating a distance between the platform 76 and the ground.

Although not shown, the platform 76 or cart 12 may have a level indicator to facilitate leveling the platform 76. After the platform 76 is adjusted to the desired position, it should be understood that it may be necessary to adjust a length of the ladder 100 in the manner described earlier herein.

The cart 12 further comprises a plurality of ramps 55, 57, 59 and 61 situated in pairs 55-57, 59-61 on sides 12a and 12b, respectively, of the cart 12 as shown. The ramps 55, 57, 59 and 61 provide ramps for guiding and moving the carts 18c-18d into and out of the storage area 16 as illustrated in FIG. 6A. The ramps 55 and 59 and ramps 57 and 61 share an associated track 156 (FIG. 6A) situated on frame member 21 and a plurality of stops 158 for retaining the carts 18a-18d on the tracks 156 while in the storage area 16.

Referring to FIGS. 7 and 8A, notice that the director's or band major's stand 12 may further comprise a plurality of shelves 152 and 154 that divide the storage area 16 into two areas 16a and 16b. The shelves 152 and 154 are pivotally secured to a support frame member 158 that extends between the frame members 56 and 62 with a plurality of hinges 160 as shown. The shelves 152 and 154 may be pivoted between a stored position, illustrated in FIG. 7, and a generally horizontal position, illustrated in FIG. 8A, after the at least one or plurality of carts 18a-18d have been removed from the storage areas 16a and 16b. Notice that after the shelves 152 and 154 are pivoted to a generally horizontal position shown in FIG. 8A, the ramps, such as ramps 55 and 57, may be pivoted from the deployed position shown in FIG. 7 to an upright position shown in FIG. 8A. Locking pins 160 and 162 (FIG. 8A) may be inserted through apertures, such as apertures 54a and 55a (FIG. 7), in the vertical members 54 and 60 in order to retain the ramps 55 and 57 in a locked and stored position during transportation, such as is illustrated in FIGS. 1, 2 and 16. Notice that ends 55b and 57b (FIGS. 7 and 8A) of ramps 55 and 57, respectively, engage and support a bottom 152a of shelf 152 to facilitate retaining the shelf 152 in the horizontal position.

Advantageously, the shelves 152 and 154 provide means or support for situating items, such as amplifiers 220 (FIG. 14), band equipment, instruments, uniforms or the like.

As illustrated in FIGS. 6A-7, during use, the ramps 55, 57, 59 and 61 may be pivoted from a stored position shown in FIGS. 1 and 2, for example, to the unloading or loading position illustrated in FIGS. 6A and 7. While they are in the unloading position, the ramps 55, 57, 59 and 61 provide means and access for loading and unloading the at least one or a plurality of carts 18a-18d. For example, notice in the illustration being described that the cart 18c (FIG. 6A) is portable and comprises a plurality of wheels 170 and 172 for rolling the cart 18c on to the ramps 55 and 57 and into the storage area 16.

Referring now to FIGS. 9-15B, various features of the carts 18a-18d will now be described. For ease of description and illustration, the cart 18c will be described, but it should be understood that the other carts 18a, 18b, and 18d have the same or similar features. In the illustration being described, the cart 18c comprises a plurality of frames 160 and 162, each comprising a generally rectangular frame member, such as frame member 161, comprising a plurality of internal ribs or supports 162a-162h, as best illustrated in FIG. 15A. Each frame 160 and 162 and internal ribs or supports 162a-162h further comprise or support a platform, such as expanded metal, wire metal grid or other surface (such as wood, polymer or the like), conventionally secured thereto by fasteners or a weld.

The supports 160 and 162 are secured together by a plurality of hinges 166 (FIG. 15A) in order to enable the supports 160 and 162 to pivot between a stored position, illustrated in FIGS. 9 and 11, and an open position illustrated in FIGS. 12, 13A, 13B and 14 as will be described later herein. Notice that at least one of the supports 160 or 162 may house and support a plurality of detachable wheel assemblies 170, 172, 174 and 176 which will now be described.

Notice in FIGS. 9-11 that the plurality of wheel assemblies 170-176 each comprise a bracket 170a, 172a, 174a and 176a onto which the swivel wheels 170b, 172b, 174b and 176b, respectively, are secured. It should be understood that the swivel wheels 170b, 172b, 174b and 176b permit the cart 18c to move, pivot or swivel 360 degrees after the assemblies 170-176 are secured in an operative position described later herein.

Notice that the frame or platform 160 comprises a plurality of storage brackets 161, 163, 165 and 167 (FIG. 10) for receiving and storing the brackets 170, 172, 174, and 176. Each of the brackets 170-176 has an associated locking pin 178 with a cotter pin 180, as best illustrated in FIG. 10. When it is desired to remove the wheel assemblies 170 and 176 from the support 160, pin 178 is removed and the wheel assemblies 170-176 are removed from the platform 160 as shown.

Referring now to FIG. 12, after the wheel assemblies 170-176 are removed from their stored positions as illustrated in FIG. 11, the ends 170a1, 172a1, 174a1 and 176a1 are received, locked in and secured to the cart 18c and the supports 160 and 162 are pivoted to the open position illustrated in FIG. 12. For example, notice in FIG. 12 that the end 170a1 is received in the aperture 162a and the end 174a1 is received in the aperture 162b as shown. After the ends 170a1-176a1 are received in the supports 160 and 162, the locking pins 180 are inserted, for example, into apertures 162c and 174c in order to lock the wheel assemblies 170-176 to the supports 160 and 162 as illustrated in FIG. 13A. For example, notice that the frame 162 comprises the aperture 162c that becomes generally aligned with the aperture 174c after the end 174a1 is inserted into the opening 162b. After the apertures 162c and 174c become generally aligned, the locking pin 180 may be inserted into the apertures 162c and 174c in order to lock the assembly 174 to the support 162. The other locking pins and assemblies 170, 172, and 176 may be secured to the supports 160 and 162 in a substantially similar manner so that the wheel assemblies 170-176 become secured and locked to the supports 160 and 162.

Notice in FIGS. 12, 13 and 13B that the cart 18c further comprises a pivotal latch or lock 192 for locking and retaining the supports 160 and 162 in the horizontal position. In this regard, note that in FIG. 13B, for example, the locking pin 190 may be removed and the latch 192 may be pivoted from the position shown in FIGS. 12 and 13B to a locked position, illustrated in FIG. 13A. After the swing arm 192 has been pivoted to the position illustrated in FIG. 13A, the locking pin 190 may be inserted through an aperture through the swing arm 190a and an aperture 160 of the support 160 in order to retain and lock the swing arm in the locked position, thereby facilitating retaining the supports 160 and 162 in the support position illustrated in FIGS. 13A and 14.

It should be understood that each cart 18a-18d comprises a pair of center wheels 191 and 193 secured to frame or support 162 as shown. These wheels 191 and 193 are spaced apart generally the same distance as the ramp pairs 55-57 and 59-61 (FIG. 6) as shown. The wheels 191 and 193 on each of the carts 18a-18d provide means for moving the carts 18a-18d onto and off of the ramps 55-61 and their associated track, such as track 156 (FIG. 5B), as illustrated in FIG. 6A. As mentioned earlier, each wheel 191 and 193 becomes situated between stops 158 to facilitate retaining the carts 18a-18d on the track 156.

It should be understood that after the supports 160 and 162 are opened to the position shown in FIG. 14, the wheels 191 and 193 touch the ground.

Notice further that at least one of the supports, such as support 162 in the illustration being described, comprises a hitch 194 that is pivotally secured thereto to enable the hitch 194 to pivot from a stored position illustrated in FIGS. 9 and 11 to a usable position illustrated in FIGS. 13A and 14. The hitch 194 further comprises a handle for manually moving the cart 18c and also a circular hitch 194b to hitch the cart 18c to another cart 18a, 18b or 18d, cart 12 or a motorized transport device such as a vehicle, golf cart or the like. The frame 160 comprises a bracket 200 and a locking pin 202 for securing the cart 18c to the circular hitch 194b of another cart, such as cart 18a, 18c and 18d.

The carts 18a-18d may further comprise a pair of brackets 200 (FIG. 12) and pin 202 with a retainer or cotter key similar to that shown in FIG. 10 for locking the supports in a closed position shown in FIG. 9, during which the supports 160 and 162 become generally parallel and opposed.

Advantageously, the cart 18c provides means and support for supporting a plurality of equipment, such as band instruments 220, amplifiers and other devices used, for example, during a band competition or other event as illustrated in FIG. 14.

Referring now to FIGS. 15A and 15B there may be circumstances where it may be desirable to have one or more of the carts 18a-18d removed from the storage area 16, but stored in an upright position, for example, when the carts are used indoors and space conservation is necessary. Accordingly, system 10 further comprises a plurality of support posts 202a and 204a for receipt in the apertures, 162a and 162b as illustrated in FIG. 15A. After the post 202a and 204a are received in the apertures 162a and 162b, respectively, the cart 18c may be moved or pivoted from the generally horizontal position shown in FIG. 15A to a generally vertical or upright position illustrated in FIG. 15B.

As mentioned earlier herein, the system 10 may comprise at least one or a plurality of the carts 18a-18d and after one or more of them are removed from the storage area 16 and deployed as shown in FIG. 13A, the carts 18a-18d may be ganged together either alone or with the storage cart 12 as illustrated in FIG. 16.

Advantageously, the system provides means, method and apparatus for storing a plurality of carts and also for providing a storage device that is capable of providing a support for one or more persons, such as a director or a drum major. The system 10 has been found to be convenient for use, for example, during band competition where it is necessary to deploy and remove equipment from a competition area, such as a gymnasium or field area easily and quickly and during an allotted time frame. Although the system 10 has been described particularly for use with band equipment and during a band competition, it should be understood that the system may have other uses and such uses are contemplated and do not depart from the true spirit and scope of the invention. For example, a rock-and-roll band may find the system 10 beneficial for use during set up and tear-down of their performance stage, or it may be used, for example, at or during football practice, construction jobs, maintenance jobs, convention jobs and the like.

Advantageously, and as mentioned earlier herein, the carts 12 and 18a-18d all comprise at least one or a plurality of swivel wheels 170b, 122b, 174b and 176b that permit each of them to move or pivot in a full range of motion, such as 360 degrees. This further facilitates manipulating and moving the carts 12 and 18a-18d to a desired location.

In the illustration shown, the cart 12 and carts 18a-18d and frame member components are welded components made of light-weight aluminum, but could be any suitable metal or even a polymer, such as HDPE. The typical dimensions for one embodiment are illustrated in the following Table I, but it should be understood that these dimensions may be larger or smaller and depend upon the size and shape of the cart 12 and carts 18a-18d. The carts 18a-18d are shown to be substantially the same size, but one or more of them may be larger or smaller if desired. Also, the cart 12 may be dimensioned or adapted to receive less or more carts 18a-18d if desired.

TABLE I

| Dimension Label | Dimension (Inches) |
| --- | --- |
| D1 (FIG. 6A) | 74" |
| D2 (FIG. 6A) | 122.25" |
| D3 (FIG. 6A) | 48" |
| D4 (FIG. 6A) | 70" |
| D5 (FIG. 6A) | 64.5" |
| D6 (FIG. 6A) | 64.25" |
| D7 (FIG. 12) | 96.5" |
| D8 (FIG. 12) | 48" |
| D9 (FIG. 6B) | 54.625" |

The carts 12 and 18a-18d may comprise a durable powder coat finish with a pre-selected pattern or color such as a color that matches a school's colors. The storage cart 12, after receiving the carts 18a-18d, is compact for trailer travel and storage. For example, the cart 12 may have dimensions 4 feet by 6 feet that extends up to 7 feet 6 inches with hitch 110. For the embodiment being illustrated, the combined weight of the carts 12 and 18a-18d may be less than 1250 pounds.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A band cart storage system comprising:
  a storage cart having a first plurality of wheels, said storage cart defining a storage area; and
  a plurality of band carts removably stored in said storage area;
  each of said plurality of band carts comprising a first support defining a first support area and a second support defining a second support area, said second support being hingeably coupled to said first support to permit said first support and said second support to be folded or moved between a stored position and an operating position, said first and second supports being generally vertical and in said stored position and generally horizontal in said operating position so that said first and second supports may support band instruments while in said operating position;
  each of said plurality of band carts further comprising a second plurality of wheels for enabling each of said plurality of band carts to be wheeled into and out of said storage area while in the stored position so that each of said plurality of band carts and associated first and second supports become stored generally vertically in said storage area;
  said first plurality of wheels on said storage cart enabling said storage cart to be wheeled in order to transport said plurality of band carts.

2. The band cart storage system as recited in claim 1 wherein said second plurality of wheels comprise swivel wheels for permitting each of said plurality of band carts to be moved or swiveled 360 degrees.

3. The band cart storage system as recited in claim 1 wherein said storage cart comprises a plurality of ramps in communication with said storage area;
  each of said plurality of band carts comprise said second plurality of wheels which are received by said plurality of ramps, respectively, when each of said plurality of band carts is moved into and out of said storage area.

4. The band cart storage system as recited in claim 1 wherein either said second plurality of wheels are detachable stored on each of said plurality of band carts.

5. The band cart storage system as recited in claim 1 wherein said system comprises at least one storage stand for supporting at least one of said plurality of band carts in a predetermined storage position after it is removed from said storage area.

6. The band cart storage system as recited in claim 1 wherein said storage cart comprises a platform situated a predetermined distance above the ground, said platform providing a support on which a person may stand.

7. The band cart storage system as recited in claim 6 wherein a position of said platform is adjustable.

8. The band cart storage system as recited in claim 6 wherein said storage cart comprises a plurality of rails moveable between a stored position and an operative position during which said plurality of rails generally surround said platform.

9. The band cart storage system as recited in claim 1 wherein said storage cart comprises a plurality of rails moveable between a stored position and an operative position during which said plurality of rails generally surround said platform.

10. The band cart storage system as recited in claim 1 wherein each of said plurality of band carts comprises a cart storage lock for locking each of said plurality of band carts in a locked position in said storage area.

11. The band cart storage system as recited in claim 1 wherein the storage cart comprises at least one shelf situated in said storage area.

12. A band equipment system comprising:
a first support;
a second support; and
at least one of said first support or said second support providing a support platform for a person and the other of said first support or said second support providing a band equipment support;
wherein said second support is foldable between a stored position and an operating position;
said second support further comprising:
a first generally planar member defining a first support area and a second generally planar member defining a second support area;
a coupling between said first and second generally planar members for hingeably coupling said first and second generally planar members together;
wherein said second support comprises a folded position during which said first and second generally planar members are generally vertical;
said first support comprising wheels and receiving and removably storing said second support in a storage area of said first support while said second support is folded in said generally vertical position and said wheels enabling said first support to transfer said second support after it is removably received in said storage area.

13. The band equipment system as recited in claim 12 wherein said second support is a band cart.

14. The band equipment system as recited in claim 12 wherein said first support is adapted to receive said second support.

15. The band equipment system as recited in claim 12 wherein said second support is a band cart comprising a plurality of wheels.

16. The band equipment system as recited in claim 12 wherein said first support comprises a first plurality of wheels.

17. The band equipment system as recited in claim 12 wherein said second support comprises a second plurality of wheels for moving said second support into and out of said storage area in said first support.

18. The band equipment system as recited in claim 17 wherein said second plurality of wheels are detachable stored on said second support.

19. The band equipment system as recited in claim 18 wherein said second support comprises a wheel storage receiver for detachably storing said second plurality of wheels.

20. The band equipment system as recited in claim 12 wherein said first support comprises a platform situated a predetermined distance above the ground, said platform providing a support on which a person may stand.

21. The band equipment system as recited in claim 20 wherein a position of said platform is adjustable.

22. The band equipment system as recited in claim 20 wherein said first support comprises a plurality of platform guides for guiding said platform when a position of said platform is adjusted.

23. The band equipment system as recited in claim 12 wherein said first support comprises a plurality of rails moveable between a stored position and an operative position.

24. The band equipment system as recited in claim 12 wherein said second support comprises a cart storage lock for locking said second support in a locked position in a storage area in said first support.

25. A band cart storage system comprising:
a storage cart comprising:
a base having a plurality of wheels;
a plurality of side walls and a platform that cooperates with said plurality of side walls and said base to define a storage area; and
a plurality of band carts removably situated on said base and in said storage area;
said plurality of band carts each comprising a first plurality of wheels for moving said plurality of band carts into and out of said storage area;
wherein each of said plurality of band carts is foldable between a folded position and an operating position;
wherein each of said plurality of band carts further comprises a first support providing a first support area and a second support defining a second support area, said first and second supports being coupled to permit each of said plurality of band carts to be folded or moved between said folded position and said operating position;
wherein each of said plurality of band carts is generally vertical when in said folded position and said storage cart receives said plurality of band carts in said storage area while said plurality of band carts are each vertical and in said folded position so that said storage cart can transport said plurality of band carts while they are in a stored and vertical position and stored in said storage area.

26. The band cart storage system as recited in claim 25 wherein plurality of band carts each comprise a second plurality of wheels for supporting said each of said plurality of band carts after it is removed from said storage area.

27. The band cart storage system as recited in claim 26 wherein said second plurality of wheels are swivel wheels for permitting said plurality of band carts to be moved or swiveled.

28. The band cart storage system as recited in claim 25 and further comprising:
at least one ramp coupled to said storage cart for facilitating moving said plurality of band carts into and out of said storage area.

29. The band cart storage system as recited in claim 26 wherein said second plurality of wheels are mounted on frame members that are detachable stored on each of said plurality of band carts.

30. The band cart storage system as recited in claim 25 wherein a position of said platform is adjustable.

31. The band cart storage system as recited in claim 25 wherein said platform defines a platform area, said storage cart further comprising:
a plurality of rails moveable between a stored position and an operative position during which said plurality of rails generally surround said platform area.

32. The band cart storage system as recited in claim 31 wherein said plurality of rails are pivotally coupled to a plurality of side walls, respectively, of said storage cart.

33. The band cart storage system as recited in claim 25 wherein said system further comprises at least one cart storage lock for locking said plurality of band carts in a locked position in said storage area.

* * * * *